United States Patent [19]
Hoffman

[11] Patent Number: 5,385,355
[45] Date of Patent: Jan. 31, 1995

[54] MONOWHEEL TRAVOIS

[75] Inventor: James V. Hoffman, 363 Foothill Blvd., San Luis Obispo, Calif. 93405

[73] Assignee: James V. Hoffman, San Luis Obispo, Calif.

[21] Appl. No.: 117,953

[22] Filed: Sep. 7, 1993

[51] Int. Cl.6 .............................................. B62D 51/04
[52] U.S. Cl. .................................. 280/1.5; 280/47.32; 280/78
[58] Field of Search ....................... 280/1.5, 78, 47.32, 280/47.3, 652

[56] References Cited

U.S. PATENT DOCUMENTS

| | | | |
|---|---|---|---|
| 4,045,040 | 8/1977 | Fails | 280/1.5 |
| 4,664,395 | 5/1987 | McCoy | 280/1.5 |
| 5,005,844 | 4/1991 | Douglas et al. | 280/1.5 |
| 5,215,355 | 6/1993 | Klumpjan | 280/1.5 |
| 5,265,891 | 11/1993 | Diehl | 280/1.5 |

Primary Examiner—Kenneth R. Rice
Assistant Examiner—Kevin Hurley
Attorney, Agent, or Firm—D'Alessandro, Frazzini & Ritchie

[57] ABSTRACT

A travois assembly, comprises a load-carrying frame having a lower end and an upper end. A single wheel is rotatably mounted on said lower end of said load carrying frame. A user harness includes a single vertical frame member attached to a horizontal frame member at a lower end thereof, a back pad attached to the vertical frame member at an upper end thereof, a belt circumferentially attached to the horizontal frame member, a pair of shoulder straps each having a first end attached to the back pad and a second end attached to the horizontal frame member. The load carrying frame is attached to the user harness by a universal joint having a first end rigidly attached to the upper end of the load carrying frame and a second end attached to the vertical frame member of the user harness.

10 Claims, 3 Drawing Sheets

MONOWHEEL TRAVOIS

BACKGROUND OF THE INVENTION

1. Field of the Invention

The present invention relates to a wheeled travois for towing supplies and other loads behind an individual. The wheeled travois of the present invention is particularly useful for towing supplies and other loads over uneven terrain.

2. The Prior Art

The prior art presents a diverse array of embodiments of different devices which may be employed to tow or carry a load behind an individual. The object of these devices is to assist an individual in transporting a load, especially those loads weighing more than an individual may comfortably carry for any significant distance. Though many different types of carriers exist, including carriers which are handheld and may be either pushed or pulled and carriers which are attached to and towed behind an individual, each of the carriers found in the prior art have at least one of several problems including stability, limitations of maneuverability or desirability of function. Of particular interest herein are carriers with a load carrying frame having a single wheel structure which may be attached to and towed behind an individual.

Prior art descriptions of carts or carriers employing a single wheel structure that may be either pushed or pulled include Murphy, U.S. Pat. No. 3,055,449; Strand, U.S. Pat. No. 3,550,997; Tracy, et al., U.S. Pat. No. 3,560,015; Fraser, U.S. Pat. No. 4,063,744; and Cockram, U.S. Pat. No. 4,171,139. Of these, Tracy, et al. and Strand disclose a backpack frame which upon removal may be converted to a single wheeled cart.

There are several readily apparent advantages to be gained with a travois structure which incorporates the features of a single wheel and an attachment for towing behind an individual. These features when embodied in a travois will narrow its profile, free the hands of the user, and allow the user to travel a greater distance with the load. However, attempts in the prior art to embody these features have not been satisfactory.

A common design disclosed by the prior art teaches a travois which is attached to the user at two points, and includes embodiments where the attachment is made to either a belt or an over the shoulder harness worn by the user. While the use of two points of attachment creates a stable arrangement, it imposes as substantial trade-offs unwanted limitations on maneuverability and desirability of use due in part to limitations on side to side movement and additional weight in the frame. Embodiments of a travois using two points of attachment may be found in Giovannoni U.S. Pat. No. 2,613,953, Lagant U.S. Pat. No. 2,655,957, Fails U.S. Pat. No. 4,045,040, and McCoy U.S. Pat. No. 4,664,395. Of these the Fails embodiment also undesirably uses a two wheel structure.

An embodiment of a travois employing a single wheel assembly and incorporating a single point of attachment is disclosed in Douglas U.S. Pat. No. 5,005,844. However, the mechanism used at the point of attachment creates an inherent instability. If the longitudinal axis of the travois lines up, even approximately, with the vertical axis of the attachment mechanism the travois and load will roll on its side. This will happen on most steep slopes. If the attachment mechanism is turned 90 degrees so the horizontal portion is on the user worn backpack the travois will roll whenever the user makes a hard turn. These inherent instabilities necessitate the use of an large roller assembly as the single wheel element or handles for the user to keep the load carrying frame in an upright position as well as a larger frame. This undesirably adds weight and severely decreases maneuverability.

b 3. Objects and Advantages.

The objects and advantages of the invention described herein are many. They are, but are not limited to, those described below.

A first object of the present invention is to provide a monowheel travois which overcomes some of the shortcomings of the prior art.

Another object of the present invention is to provide a monowheel travois which employs an abbreviated backpack frame that distributes the load from the load carrying frame to the individual. This has the advantage of providing a less cumbersome more maneuverable assembly with less weight and fewer pieces.

A further object of the present invention is to provide a monowheel travois which employs an attachment between the backpack and the load carrying frame that will allow the travois to move side to side (yaw) and up and down (pitch) relative to the user without allowing the travois to roll from an upright position. This enables the travois to be supported at it's lower end on a wheel made up of a single disk allowing a narrower profile than the prior art arrangements. The advantages to this configuration are numerous, including the ability to follow the user down narrow trails, and to squeeze between trees and other obstacles.

Yet another object of the present invention is to provide a travois which may be quickly released from the user's backpack. This has obvious advantages in an emergency and is useful at any time the user wants to separate from the travois A further object of the present invention is to provide a monowheel travois which employs a load carrying frame configured so that it may be dragged over obstacles too big for the wheel to roll over. The advantage to this is that there is virtually no terrain that the travois cannot traverse.

Another object of the present invention is to provide a monowheel travois which can be carried in a similar manner to a standard backpack without the wheel on the ground. The advantage here is that it can be carried over terrain that it cannot roll over.

Another object of the present invention is to provide a monowheel travois which employs a single braking system that can apply variable braking pressure to the wheel and continuously lock the wheel for steep descents. The locking feature is also valuable when the travois is not in use and resting on the ground.

Yet another object of the present invention is to provide a monowheel travois which employs a load carrying frame configured so that the center of gravity of the load is below the center of gravity of the travois. The load must also be placed so that it does not interfere with the users normal stride. This creates a very stable arrangement that is not prone to roll over and is very maneuverable.

A final object of the present invention is to provide a monowheel travois which employs a wide range of adjustment in length and backpack attachment points. This enables the travois to fit a wide range of user body types comfortably, The Travois should also break down into pieces small enough to fit into a average automobile trunk.

Other advantages to the present invention will become evident in the following descriptions.

BRIEF DESCRIPTION OF THE INVENTION

A travois assembly, comprises a load-carrying frame having a lower end and an upper end. A single wheel is rotatably mounted on said lower end of said load carrying frame. A user harness includes a single vertical frame member attached to a horizontal frame member at a lower end thereof, a back pad attached to the vertical frame member at an upper end thereof, a belt circumferentially attached to the horizontal frame member, a pair of shoulder straps each having a first end attached to the back pad and a second end attached to the horizontal frame member. The load carrying frame is attached to the user harness by a universal joint having a first end rigidly attached to the upper end of the load carrying frame and a second end attached to the vertical frame member of the user harness.

According to a presently preferred embodiment of the invention, the back pad is vertically adjustable. In addition, the position where the load carrying frame is connected to the vertical frame member of the user harness is also vertically adjustable.

According to another aspect of the invention, a braking system is employed to allow the user of the travois to apply frictional force to oppose the rotation of the wheel. This feature of the invention is useful for applications where descending hills is encountered.

According to another aspect of the present invention, means are provided for quickly releasing the load carrying frame from the user harness. This feature of the invention is important in an emergency situation, such as a fall by the user of the travois.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

In the present invention, a single wheeled travois and backpack apparatus is described wherein the travois is connected to the backpack at a single point. The structure employed at the place of connection provides several unique and desirable features including a quick release mechanism, and a universal joint assembly.

Figure 1:
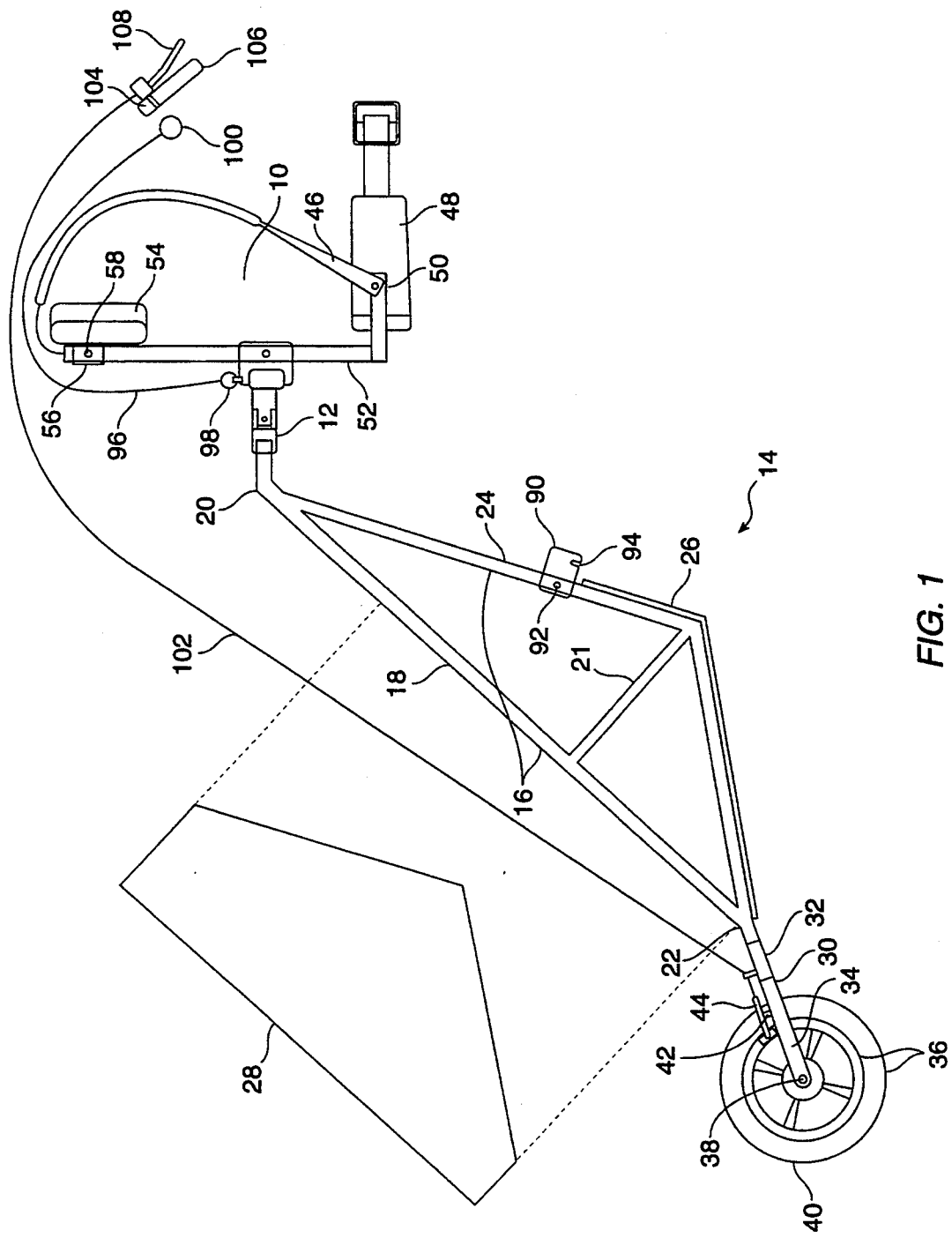
FIG. 1 is a side view of the travois of the present invention shown elevated as if in use and with the saddlebags removed.
Figure 2:
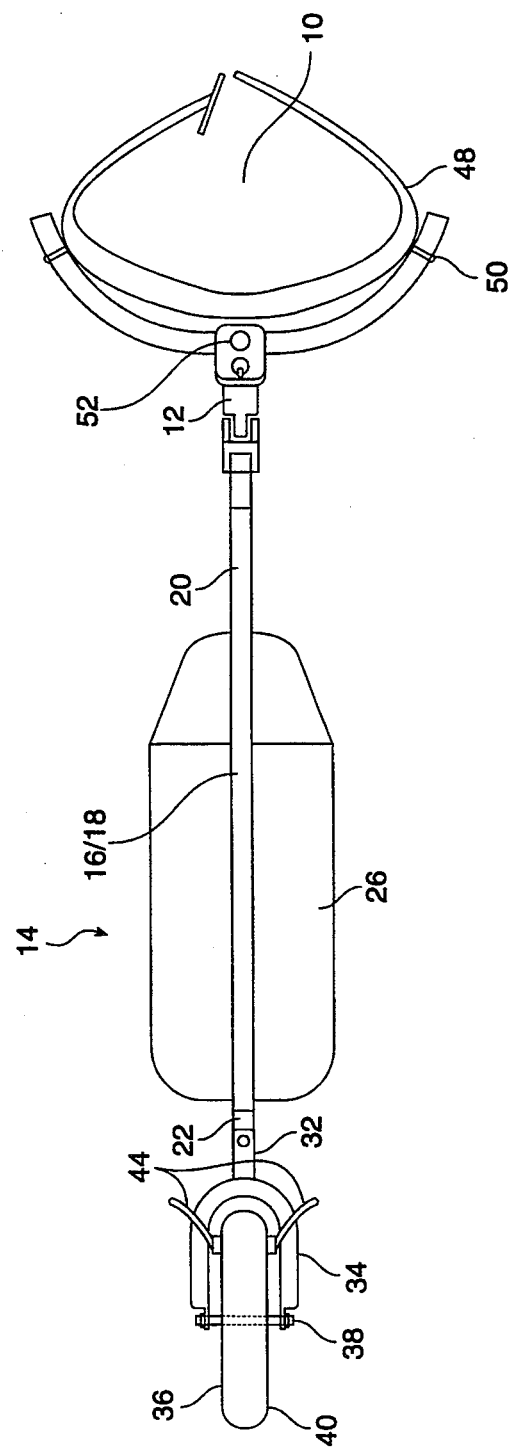
FIG. 2 is a top view of the travois of the present invention, with the cables, the backpack pad and straps omitted for clarity.

Referring first to FIGS. 1 and 2, side and top views of a presently preferred embodiment of the monowheel travois of the present invention are shown. In these views, a user worn backpack 10 is shown connected by a universal joint assembly 12 to a single wheeled travois 14.

From FIGS. 1 and 2, it may be seen that travois 14 includes a generally triangular shaped load bearing frame 16 which may be formed from a lightweight sturdy material such as aluminum tubing. In the embodiment of FIGS. 1 and 2, load bearing frame 16 includes a main load bearing frame member 18 including two bends therein to form an upper end 20 and a lower end 22. A lower load bearing frame member 24 is bent near its midpoint and has its ends welded near the bends in the main load bearing member 18. A brace member 21 is welded between the bend in the lower load bearing frame member 24 and main load bearing frame member 18 to form a support between the main load bearing member 18 and the lower load bearing frame member 24 and strengthen load bearing frame 16.

While a particular embodiment which has actually been constructed according to the principles of the present invention has been described, those of ordinary skill in the art will recognize that different configurations of load bearing frame 16 are possible. Non-limiting examples include, a single load bearing frame member, a "cage" for the load or a single large diameter cylindrical member with storage space in its interior. Other materials may also be used to fabricate the load bearing frame 16 including thin wall high tensile steel tube or carbon fibre-epoxy composite. Further, the load bearing frame 16 can be collapsible to facilitate storage in an automobile trunk, and the upper end 20 of main bearing frame member 18 can be formed from telescoping sections to allow for adjustment in length to suit individual users.

The upper end 20 of the main load bearing frame member 16 is bent at an angle behind the universal joint assembly 12 such that it is attached to the universal joint assembly 12 in an approximately horizontal position when in use. This keeps the vertical side of the universal joint horizontal when the user and the travois are in a normal position to each other and allows more freedom of movement on steep slopes.

A skidplate 26 may be attached to the underside of the lower load bearing frame member 24. The skidplate 26 may be formed from a material such as ABS plastic cut to shape and molded to fit the underside of the lower load bearing frame member 24. Other embodiments of the skidplate 26 include aluminum sheet or carbon fibre-epoxy composite molded integrally to the lower load bearing frame member 24. When the user encounters terrain that the wheel is unsuitable for, the skid plate 26, supported by the lower load bearing frame member 24 acts as a sled allowing the user to drag the travois 14 over virtually any terrain. The skid plate 26 also protects the load and may also be employed as a stand to keep the travois 14 in an upright position when sitting on the ground or during loading and unloading.

Those of ordinary skill in the art will recognize that a variety of structures may be employed for securing the load onto the travois 14 including the saddlebag structure 28 shown in FIG. 1. As indicated in FIG. 1, saddlebag structure 28 may be removable for the convenience of the user and will be fastened to the load-carrying frame by any one of a number of conventional means, such as straps, etc.

Saddlebags 28 can be any type of convenient arrangement of bags to serve this purpose. The current embodiment uses a pair of backpack-bags manufactured by Sierra Designs and modified with a series of grommets (not shown) to enable them to be fixed to the main load bearing frame member 18 with a series of clevis pins (not shown). It would be convenient to make use of a set of custom made saddlebags 28 to approximately conform to the shape of the load bearing frame 16. Several arrangements of straps (not shown) attached to the skid plate 26, the saddlebags 28 and/or the load bearing frame 16 may be used to further affix the load to the load bearing frame 16. One of ordinary skill in the art will recognize that many different types of load carrying bags and devices can be used to affix the load to the load bearing frame 16.

A steel wheel fork 30 comprising a shaft 32 and a fork 34 is attached to the lower end 22 of the load bearing frame 16. This may be accomplished by, for example, fitting and pinning the lower end 22 of the load bearing frame 16 within a sleeve in the wheelshaft 32. A wheel assembly 36 is mounted on axle 38, which is mounted to fork 34 in a conventional manner. As presently preferred, wheel assembly 36 comprising a ten inch injection molded wheel 38 and a radially mounted inflatable inner tube and rubber tire assembly 40. Posts 42 are attached to the fork 34 to form the attachment for a brake assembly 44 which in the preferred embodiment is a cantilever type. Those of ordinary skill in the art will recognize that a variety of embodiments may be employed for both the type of brake assembly 44 and the type and size of wheel assembly 36, and that these embodiments are readily available from the bicycle industry. Easy removal of the wheel assembly 36 and steel wheel fork 30 for storage of the travois 14 is facilitated by incorporating a spring loaded type telescoping assembly (not shown) for attaching the steel wheel fork 30 to the load bearing frame 16.

As may be seen in FIG. 1, backpack 10 includes a harness and a external backpack frame. The harness comprises a pair of shoulder straps 46 and a waist belt 48. Those of ordinary skill in the art will recognize that existing harnesses currently manufactured for use on external frame backpacks can be modified for use on the present invention. The external backpack frame comprises a horizontal backpack frame member 50, a vertical backpack frame member 52, and a backpad 54.

To assemble the backpack 10, the waist belt 48 and the lower ends of shoulder straps 46 are attached with a nut and bolt or clevis pin to the outer ends of the horizontal backpack frame member 50. The horizontal backpack frame member 50 is shown attached at its midpoint to the lower end of the vertical backpack frame member 52. An integrated assembly including backpad 54 and first adjustable clamp 56 is mounted on the upper end of vertical backpack frame member 52 using a first locking screw 58. The upper ends of shoulder straps 46 are then fastened to the first adjustable clamp 56 on the sides of the backpad 54. The simplified construction of the external backpack frame with fewer components make it very light, enhancing both comfort and freedom of movement. Further, this arrangement provides the user with wide field of view.

Several features of the elements of the backpack 10 should be noted. As can be seen in the view shown in FIG. 2, the horizontal backpack frame member 50 is radially curved to generally fit the curvature of a users back. This feature enhances the stability of the travois 14 and provides greater comfort to the user of the backpack 10. The integrated backpad 54 and first adjustable clamp 56 are adjustable to different heights relative to the horizontal backpad frame member 50 by loosening the first locking screw 58 and then sliding the integrated backpad 54 and first adjustable clamp 56 to a position in either direction along the vertical backpad frame member 52 and then tightening the first locking screw 58. Those of ordinary skill in the art will recognize that a variety of mechanisms may be employed to fasten and unfasten the first adjustable clamp 56. The adjustability of the backpad 54 and upper shoulder strap 46 to accommodate the height of a particular user greatly enhances comfort and stability.

In the preferred embodiment, the backpack frame may be formed from tubular aluminum stock. The horizontal and vertical backpack frame members 50 and 52, respectively, are preferably welded at their juncture, although other known fastening means may be employed. Other embodiments of the backpack frame could make use of materials such as thin wall high tensile steel tubing, carbon fibre-epoxy composite construction, injection molded plastics, or a combination thereof. In the preferred embodiment of the integrated backpad 54 and first adjustable 56, the backpad 54 may comprise foam covered ABS plastic shaped to fit the human back and encased in nylon mesh (not shown), and the integral first adjustable clamp 56 may comprise aluminum. Other embodiments of the integrated backpad 54 and first adjustable 56 may also include many types of injection molded plastics having both components molded as one piece.

Figure 3:
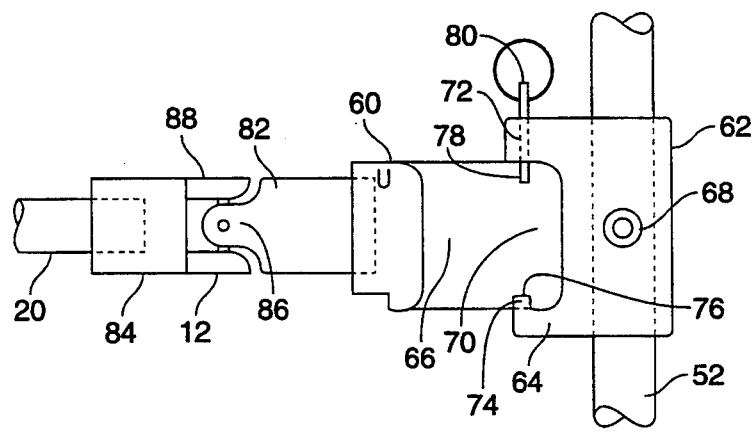
FIG. 3 is a side view detail of a presently preferred quick release/universal joint assembly of the travois of the present invention.
Figure 4:
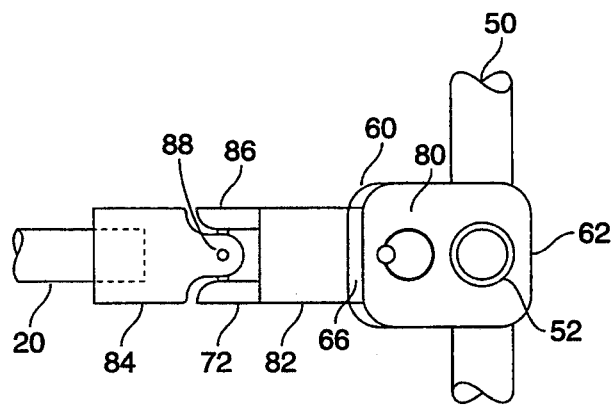
FIG. 4 is a top view detail of the quick release/universal joint assembly of FIG. 3.

Referring now to FIGS. 3 and 4, a presently preferred embodiment of the universal joint assembly 12 employed to couple the backpack 10 to the travois 14 is shown along with a quick-release mechanism 60. The quick release mechanism 60 includes a second adjustable clamp 62 including a female release member 64 into which fits a male release member 66 connected to universal joint assembly 12. Although the present embodiment shows the male release member 66 of second adjustable clamp 62 connected to the universal joint assembly 12 and the female release member connected to the backpack frame 10, those of ordinary skill in the art will recognize that this arrangement could be reversed.

The second adjustable clamp 62 is mounted on the vertical backpack frame member 52 and fastened to the vertical backpack frame member 52 by a locking screw 68. Like first adjustable clamp 56, second adjustable clamp 62 is adjustable to different heights relative to the horizontal backpad frame member 50 by loosening the second locking screw 68 and then sliding the second adjustable clamp 62 to a selected position in either direction along the vertical backpad frame member 52 and then tightening the second locking screw 68. Those of ordinary skill in the art will recognize that a variety of mechanisms may be employed to fasten and unfasten the second adjustable clamp 62. This allows the load point to be configured for any given users height or personal preferences. Those of ordinary skill in the art will recognize that a variety of mechanisms may be employed to fasten and unfasten the second adjustable clamp 62. It is not necessary, however, that the mechanism employed to fasten and unfasten both the first adjustable clamp 56 and the second adjustable clamp 62 be the same.

In the preferred embodiment, both the second adjustable clamp 62 and the male release member 66 of the universal joint assembly 12 are of milled aluminum. Other embodiments could make use of steel, carbon fibre-epoxy composite or injection molded plastic for these elements.

The female release member 64 of the quick release mechanism 60 comprises an aperture 70 disposed in a sidewall of the second adjustable clamp 62, and a first quick release pinhole 72 passing vertically through the top of the second adjustable clamp 62 into the aperture 70. The aperture 70 is roughly rectangular in shape having inside corners that are rounded and a lip 74 at the base of the aperture 70. The male release member 66 of the universal joint assembly 12 is also roughly rectangular in shape having corners rounded to mate with the aperture 70, a groove 76 shaped to mate with the lip 74 of aperture 70, and a second quick release pinhole 78. The first quick release pinhole 72 and the second quick release pinhole 78 are formed such that when male release member 66 is mated with female release member 64, the first and second quick release pinholes 72 and 78 will be in alignment with one another.

The quick release mechanism 60 is engaged by positioning the groove 76 over the lip 74, mating the male release member 66 with the female release member 64, and then inserting a quick release pin 80 through the first quick release pinhole 72 into the second quick release pinhole 78.

Those of ordinary skill in the art will recognize that, while the illustrative embodiment of the invention described herein provides for the quick release mechanism to decouple the universal joint and load carrying frame from the user harness, embodiments which provide for the quick release of the load carrying frame from the universal joint and user harness are equivalent and are within the scope of the present invention. Many other equivalent embodiments of the quick release mechanism are possible. For example, in one embodiment, female release member 64 could be spring loaded to actively eject a male release member 66 when quick release pin 80 is pulled. The configuration could also be altered to incorporate a ski-binding type release that will release the male member 66 when a preset maximum load setting has been reached.

Referring still to FIGS. 3 and 4, it may be seen that universal joint assembly 12 comprises an automotive universal joint from a domestic power steering system. Those of ordinary skill in the art will recognize that other embodiments of a universal joint may be employed. A first end 82 of universal joint assembly 12 is attached to male release member 66, and a second end 84 of universal joint 12 is attached to upper end 20 of load bearing frame 16 (FIGS. 1 and 2). The first end 82 of universal joint assembly 12 is attached to male release member 66 by pinning it within a sleeve in male release member 66. The second end of universal joint assembly 12 is attached to upper end 20 of load bearing frame 16 by pinning upper end 20 of load bearing frame 16 within a sleeve in second end 84 of universal joint assembly 12.

The universal joint assembly 12 enables the travois to be trailed on one wheel without sacrificing stability and further keeps the load and travois vertically positioned at all times no matter what the cross slope or terrain the user is walking across. Referring to FIG. 3, it may be seen that as the travois 14 starts to align vertically with the user's back, the first pair of universal joint arms 86 progressively engage the second pair of universal joint arms 88. At its extreme limit of travel this will lock the first pair of universal joint arms 86 between the second pair of universal joint arms 88 preventing rollover of the travois 14 on steep slopes. Referring to FIG. 4, it may be seen that as the user makes an extreme turn to the felt or right the second pair of universal joint arms 88 will similarly engage the first pair of universal joint arms 86 until fully locked when the universal joint is in the 90 degree position. This prevents rollover of the travois 14 when it is at a sharp angle to the user.

A third adjustable clamp 90 may be attached to the lower load bearing frame member 24 by a locking screw 92. Third adjustable clamp 90 is equipped with a male release member 94 shaped like the male release member 66 of quick release mechanism 60 and may be engaged within the female release member 64 of the quick release mechanism 60 in the same manner as male release member 66. By engaging the male release member 94 with female release member 64 on second clamp 62, the travois can be carried on the users back, with the wheel off the ground, in a manner similar to a normal backpack. The third adjustable clamp 90 may be positioned along the lower load bearing frame member 24 in the same manner recited for positioning the first and second adjustable clamps 56 and 62 along the vertical backpack frame member 52. Those of ordinary skill in the art will recognize that a variety of mechanisms may be employed to fasten and unfasten the third adjustable clamp 90. The ability to be able to trail the travois or to pick it up and carry it makes the travois 14 more versatile, allowing it to be used in virtually any terrain.

Several features of the travois described above should be noted. While being simple and lightweight, lower load bearing frame member 24 is configured to keep the load from rotating about the frame and to keep the center of gravity of the load below the center of gravity of the travois 14. The lower load bearing frame member 24 also has a geometry that provides room for the user with a normal stride in front of and underneath the load bearing frame 16. Further, with the single wheel assembly 36, the profile of the travois 14 is very narrow, and the ability to tow the travois 14 in narrow, confined or rough places is enhanced. All of these features work together to provide a travois 14 with increased comfort, maneuverability and function. Along with the universal joint assembly 12, the travois 14 user has an unprecedented freedom of movement while towing a load with the travois 14.

Referring again to FIG. 1, two cables can be observed. A first cable 96 is shown attached at one end with a cable clamp (not shown) to a first ring 98 on quick release pin 80. A second ring 100 is attached with a cable clamp (not shown) to the other end of the first cable 96. First cable 96 may be draped over the shoulder of a user to be readily available or may be passed through a loop (not shown) fastened to shoulder straps 46 by a variety of means known in the art.

First cable 96 is employed to operate the quick release mechanism 60. By pulling on the second ring 100, the quick release pin 80 may be withdrawn from the first quick release pinhole 72 and the second quick release pinhole 78, disengaging the quick release mechanism 60. The weight of the travois 14, rotating on the universal joint assembly 12, will disengage the quick release mechanism 60, allowing the user to quickly detach the backpack 10 from the travois 14 while underway if necessary. This is an important safety feature. The quick release mechanism 60 is also an important convenience feature by making the travois 14 easy to disengage to be picked up and carried, dragged, or reattached to the backpack 10 by the male release member 90 on load bearing member 24 so that it may be carried on the backpack 10.

A second cable 102 is shown attached at one end to the brake assembly 44 and at the other end to a brake handle assembly 104 comprising a handle 106 and a brake lever 108. Second cable 102 may also be draped over the shoulder of a user to be readily available or may be passed through a loop (not shown) fastened to shoulder straps 46 by a variety of means known in the art. The braking system, composed of brake assembly 44, second cable 102 and brake handle assembly 104 act as a normal bicycle brake on the wheel.

From the above disclosure, persons of ordinary skill in the art will readily recognize that numerous modifications of the illustrative embodiment disclosed above are possible without departing from the spirit of the invention. For example, the wheel could be replaced by a single ski, thus allowing the travois of the present invention to be used in the snow. Alternatively, the backpack could be eliminated and the second adjustable clamp 62 could be attached to a single point on a bicycle frame member, allowing the travois of the present invention to be towed behind a bicycle.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is;

1. A travois assembly, comprising:
   a load-carrying frame having a lower end and an upper end;
   a single wheel rotatably mounted on said lower end of said load carrying frame;
   a user harness having a single vertical frame member attached to a horizontal frame member at a lower end thereof, a back pad attached to said vertical frame member at an upper end thereof, a belt circumferentially attached to said horizontal frame member, a pair of shoulder straps each having a first end attached to said back pad and a second end attached to said horizontal frame member; and
   a universal joint having a first end attached to said upper end of said load carrying frame and a second end detachably coupled to said vertical frame member of said user harness at a coupling point thereof.

2. The travois assembly of claim 1, further including braking means coupled to said wheel and brake actuating means, accessible to a wearer of said user harness, for actuating said braking means.

3. The travois assembly of claim 1, wherein said load carrying frame includes a skid plate disposed on an underside thereof.

4. The travois assembly of claim 1, wherein said coupling point of said vertical frame member is vertically adjustable.

5. The travois of claim 1, further including means for fastening said load carrying frame to said user harness at said coupling point in a position such that said wheel will not be in contact with the ground when said user harness is being worn by a user.

6. A travois assembly, comprising:
   a load-carrying frame having a lower end and an upper end;
   a single wheel rotatably mounted on said lower end of said load carrying frame;
   a user harness having a single vertical frame member attached to a horizontal frame member at a lower end thereof, a back pad attached to said vertical frame member at an upper end thereof, a belt circumferentially attached to said horizontal frame member, a pair of shoulder straps each having a first end attached to said back pad and a second end attached to said horizontal frame member;
   a universal joint having a first end attached to said upper end of said load carrying frame and a second end detachably coupled to said vertical frame member of said user harness at a coupling point thereof; and
   quick release means for rapidly detaching said load carrying frame from said user harness.

7. The travois assembly of claim 6, further including braking means coupled to said wheel and brake actuating means, accessible to a wearer of said user harness, for actuating said braking means.

8. The travois assembly of claim 6, wherein said load carrying frame includes a skid plate disposed on an underside thereof.

9. The travois assembly of claim 6, wherein said coupling point of said vertical frame member is vertically adjustable.

10. The travois of claim 6, further including means for fastening said load carrying frame to said user harness at said coupling point in a position such that said wheel will not be in contact with the ground when said user harness is being worn by a user.

* * * * *